US008638976B2

(12) United States Patent
Watanabe

(10) Patent No.: US 8,638,976 B2
(45) Date of Patent: Jan. 28, 2014

(54) SPEAKER DEVICE

(75) Inventor: Kazuaki Watanabe, Tendo (JP)

(73) Assignees: Pioneer Corporation, Kanagawa (JP); Tohoku Pioneer Corporation, Yamagata (JP)

( * ) Notice: Subject to any disclaimer, the term of this patent is extended or adjusted under 35 U.S.C. 154(b) by 427 days.

(21) Appl. No.: 12/670,819

(22) PCT Filed: Jul. 31, 2007

(86) PCT No.: PCT/JP2007/065007

§ 371 (c)(1),
(2), (4) Date: Jan. 26, 2010

(87) PCT Pub. No.: WO2009/016743

PCT Pub. Date: Feb. 5, 2009

(65) Prior Publication Data

US 2010/0203918 A1 Aug. 12, 2010

(51) Int. Cl.
*H04R 9/06* (2006.01)
*H04M 1/02* (2006.01)

(52) U.S. Cl.
USPC .......................................... 381/400; 381/401

(58) Field of Classification Search
USPC ......... 381/399, 403, 396, 433, 404, 400, 401; 455/550.1, 550, 569.1, 568
See application file for complete search history.

(56) References Cited

U.S. PATENT DOCUMENTS 5,943,627 A * 8/1999 Kim et al. .................. 455/569.1
7,106,879 B2 9/2006 Yano
7,873,179 B2 1/2011 Takewa
2005/0175205 A1* 8/2005 Takahashi ..................... 381/336
2005/0201587 A1* 9/2005 Nagata et al. ................ 381/403
2005/0276435 A1* 12/2005 Watanabe ..................... 381/399
2008/0273740 A1* 11/2008 Takewa ......................... 381/412

FOREIGN PATENT DOCUMENTS

CN 1579110 A 2/2005

(Continued)

OTHER PUBLICATIONS

International Search Report w/translation from PCT/JP2007/065007 dated Aug. 28, 2007 (4 pages).

(Continued)

*Primary Examiner* — Duc Nguyen
*Assistant Examiner* — Phan Le
(74) *Attorney, Agent, or Firm* — Osha Liang LLP

(57) ABSTRACT

A speaker apparatus that even when being relatively thin and compact, realizes reduction of generation of abnormal noise by contact between a lead wire and another member, reduction of breakage of lead wire and reduction of deterioration of sound quality. The speaker apparatus is one comprising magnetic circuit (2) provided with a magnetic gap in which voice coil (33) is fitted with play; vibrator (3) directly or indirectly fixed to the voice coil (33); frame (5) supporting the vibrator (3), provided thereinside with the magnetic circuit (2); and terminal part (6) to which lead wire (4) from the voice coil (33) is connected, wherein lead path (7) for passage of the lead wire (4) coming from the voice coil (33) is disposed between the voice coil (33) fitted with play in the magnetic gap (G) and the terminal part (6) provided in the frame (5).

9 Claims, 13 Drawing Sheets

1

(56) References Cited

FOREIGN PATENT DOCUMENTS

| | | | |
|---|---|---|---|
| JP | 57-151096 | U | 9/1982 |
| JP | 2003-521184 | A | 7/2003 |
| JP | 2003-348690 | A | 12/2003 |
| JP | 2004-96670 | A | 3/2004 |
| JP | 2003-37895 | A | 9/2004 |
| JP | 2005-229224 | A | 8/2005 |
| WO | 2006/098243 | A1 | 9/2006 |

OTHER PUBLICATIONS

Office Action issued in corresponding Chinese Application No. 200780100097.1 dated Apr. 26, 2012, and English translation thereof (10 pages).

Office Action issued in corresponding Chinese Application No. 200780100097.1 dated Nov. 26, 2012, and English translation thereof (9 pages).

* cited by examiner

1A

SPEAKER DEVICE

FIELD OF INVENTION

The invention is related to a speaker device.

BACKGROUND OF THE INVENTION

In a general speaker device, a voice coil fixed to a diaphragm is arranged to vibrate vibratably in a magnetic gap of a magnetic circuit. A lead wire pulled out of the voice coil is fixed and electrically connected to a terminal part provided on a speaker frame. For example, a general speaker device possesses the structure that the lead wire is connected to the terminal part not in a straight line, but connected with some extra length portions such as bent portions, etc. (for example, see Japanese Patent Publication 2003-348690). In the above speaker device, the lead wire is adaptable to the displacement of the voice coil and the stress applied to the lead wire is reduced by the bent portions of the lead wire.

DISCLOSURE OF THE INVENTION

However, for a thin speaker device or small speaker device, the space for the lead wire of the voice coil is limited such that the extra length portions can contact the magnetic circuit, the diaphragm and the edge part, etc., thereby making abnormal noise, or otherwise causing breakage of the lead wire due to the stress applied to the connecting part between the lead wire and the terminal part.

Further, for a thin speaker device or small speaker device, the configuration (pathway) of the lead wire between the voice coil and the terminal part has a large affect on the weight balance of the voice coil. If the weight balance is poor, unwanted vibrations occur, causing the deterioration of acoustic quality.

According to one aspect of the present invention, a speaker device includes a magnetic circuit having a magnetic gap where a voice coil freely fits, a vibrating body bonded directly or indirectly to the voice coil, a frame for supporting the vibrating body and housing the magnetic circuit, and a terminal part to which the lead wire of the voice coil is connected. A passage through which the lead wire pulled out of the voice coil is arranged between the voice coil freely fitted in the magnetic gap and the terminal part provided in proximity of the frame. The lead wire is configured to be in a bent shape substantially point-symmetrically with respect to the center of the voice coil in the passage.

DETAILED DESCRIPTION OF THE INVENTION

The speaker device according to a embodiment of the present invention, includes a magnetic circuit having a magnetic gap where a voice coil freely fits, a vibrating body bonded directly or indirectly to the voice coil, a frame for supporting the vibrating body and housing the magnetic circuit, and a terminal part to which the lead wire of the voice coil is connected, wherein a passage is arranged through which the lead wire may be pulled out of the voice coil between the voice coil which is freely fitted in the magnetic gap and the terminal part provided in proximity of the frame.

According to the speaker device as structured above, the magnetic circuit has a passage through which the lead wire may pass between the voice coil which is freely fitted in a magnetic gap and the terminal part provided in proximity of a frame such that the lead wire of the voice coil can be electrically connected through this passage to the terminal part provided in proximity of the frame. Therefore, the lead wire can be prevented from contacting, for example the magnetic circuit, the diaphragm and the edge part, thus reducing the generation of abnormal noise. Further, a thin speaker device or a small speaker device with high acoustic quality can be produced. In addition, as the lead wire can be prevented from contacting other member, breakage of the lead wire due to such contact can be prevented.

Hereinafter, a speaker device according to one embodiment of the present invention is described with reference to the drawings.

[First Embodiment]

Figure 1:
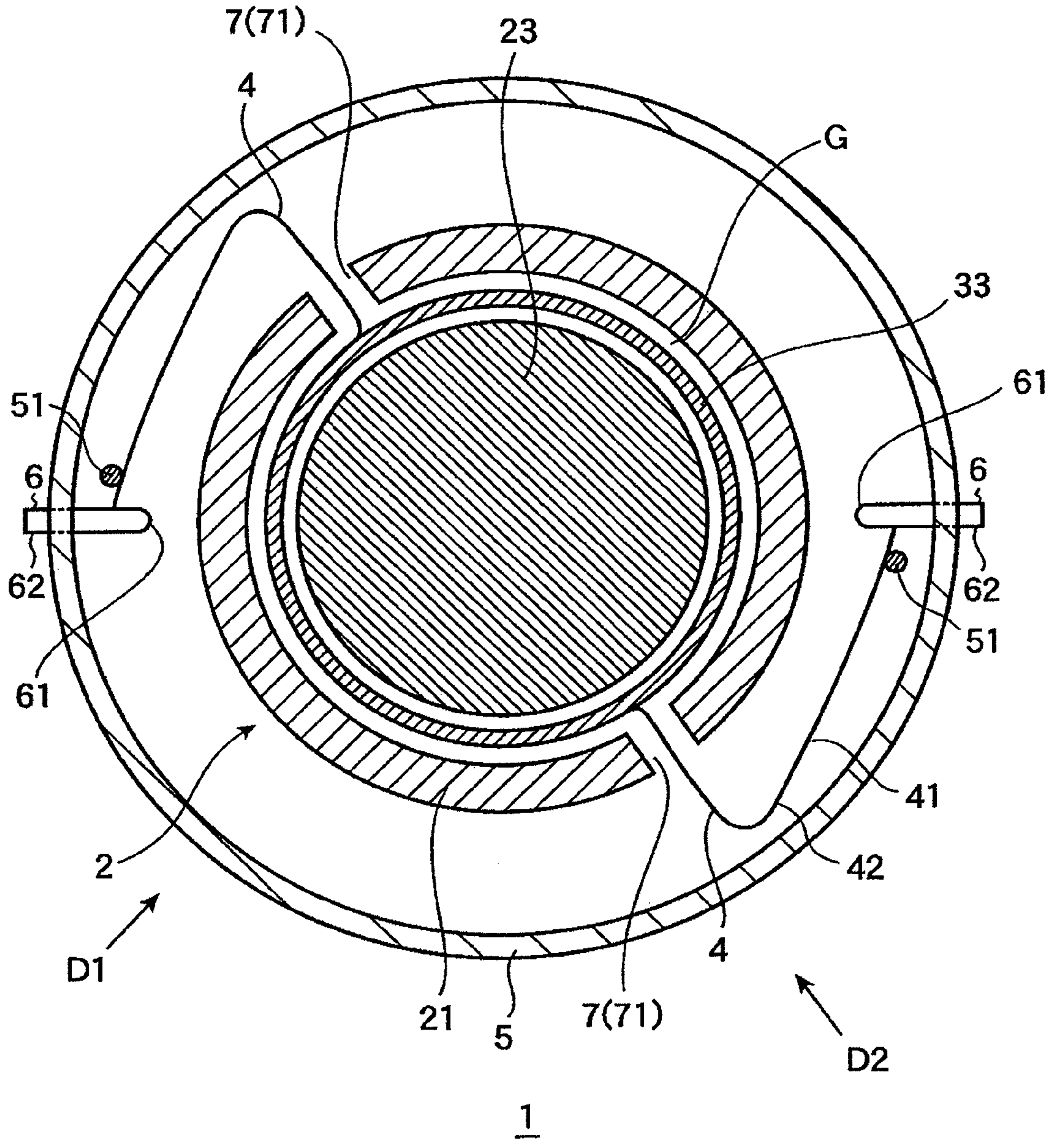
FIG. 1 is a plan view of a speaker device 1 according to a first embodiment of the present invention.

FIG. 1 is a plan view of a speaker device 1 according to a first embodiment of the present invention. FIG. 2(A) is a sectional view of the speaker device 1 viewed from a viewing direction D1 shown in FIG. 1 and FIG. 2(B) is a sectional view of the speaker device 1 viewed from a viewing direction D2 in FIG. 1. The diaphragm and edge of a speaker device are not shown in FIG. 1.

The speaker device 1 according to this embodiment is thin and small as shown in FIG. 1. Further, the speaker device 1 according to this embodiment is adopted for a mobile phone, an earphone, etc.

The speaker device 1 according to this embodiment includes a magnetic circuit 2, a vibrating body 3, a voice coil 33, a lead wire 4, a frame 5, and a terminal part 6. The magnetic circuit 2 has a passage 7 through which the lead wire 4 of the voice coil 33 may be pulled.

A magnetic circuit 2 corresponds to a magnetic circuit according to one embodiment of the present invention; a vibrating body 3 corresponds to a vibrating body according to one embodiment of the present invention; a frame 5 corresponds to a frame according to one embodiment of the present invention. A voice coil 33 corresponds to a voice coil according to one embodiment of the present invention; a lead wire 4 corresponds to a lead wire according to one embodiment of the present invention; and a terminal part 6 corresponds to a terminal part according to one embodiment of the present invention. A passage 7 corresponds to a passage according to one embodiment of the present invention.

For example, inner-magnet-type magnetic circuit and an outer-magnet-type magnetic circuit can be adopted as the magnetic circuit 2. The inner-magnet-type magnetic circuit is adopted for the present embodiment. The magnetic circuit 2 has a magnetic gap G where the voice coil 33 freely fits.

Figure 2:
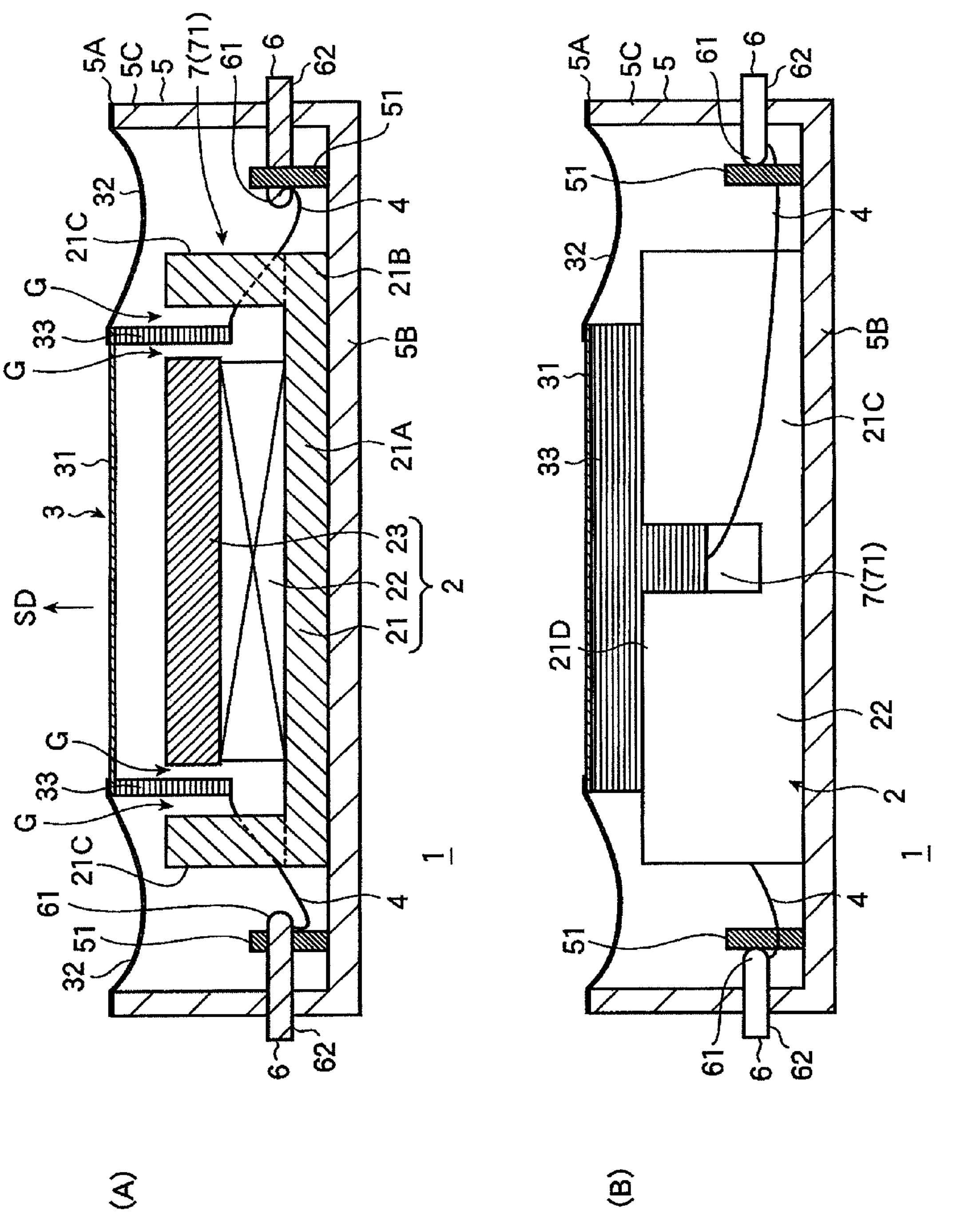
FIG. 2(A) is a sectional view of the speaker device 1 viewed from a viewing direction D1 shown in FIG. 1.
FIG. 2(B) is a sectional view of the speaker device 1 viewed from a viewing direction D2 in FIG. 1.

Specifically, the magnetic circuit 2 according to this embodiment includes a yoke 21, a magnet 22 and a plate 23. The yoke 21 has a bottom portion 21A, a bent portion 21B and a side portion 21C. The bottom portion 21A of the yoke 21 has a substantially round plate, a bent portion 21B of the yoke 21 is bent from the bottom portion 21A of the yoke 21 to the acoustic wave emitting direction (SD), and a cylindrical side portion 21C of the yoke 21 extends from the bent portion 21B to the acoustic wave emitting direction as shown in FIGS. 1 and 2. Further, the yoke 21 has a cross-section shape formed substantially in a U shape, as shown in FIG. 2. The bottom portion 21A, the bent portion 21B and the side portion 21C of the yoke 21 are integrally formed using a known material such as an iron.

Further, the yoke 21 has a cutout 71 formed in the side portion 21C. The cutout 71 corresponds to one embodiment of the passage 7. The passage 7 is provided between the voice coil 33 which is freely fitted in the magnetic gap G, and the terminal part 6 provided at the frame 5. Further, the cutout 71 is formed near the pull-out position of the voice coil 33, as shown in FIG. 1. The cutout 71 according to this embodiment is formed substantially symmetrically with respect to the center axis of the voice coil 33 and located at a predetermined interval. The yoke 21 according to this embodiment has a substantially U-shaped cutout 71 with a predetermined length, formed from the upper end portion 21D to the bottom portion 21A of the yoke 21 as shown in FIG. 2(A) or FIG. 2(B). The lead wire 4 pulled out of the voice coil 33 is connected through the cutout 7 to the terminal part 6 provided in proximity of the frame 5. For example, the lead wire 4 is connected to the terminal part 6 by soldering, or thermo-compression, etc.

The lead wire 4 is arranged at a predetermined distance from the cutouts 71. Specifically, the configuration of the lead wire 4 and the cutout 71 of the passages 7, the location of the terminal part 6 with respect to the location of the cutout 71, and the location of the support member 51 with respect to the location of the cutout 71 are adapted such that the lead wire 4 does not contact with at least yoke 21, frame 5, edge 32 and cutout 71 even when the voice coil vibrates, for example in a vertical direction (acoustic wave emitting direction).

The magnet 22 is made of a permanent magnet such as a neodymium magnet, a samarium-cobalt magnet, an alnico magnet, and a ferrite magnet. The magnet 22 is located on the bottom portion 21A of the yoke 21 as shown in FIG. 2(A). The magnet 22 according to the present embodiment is formed in a columnar shape.

The plate 23 is made up of a predetermined material such as iron and located on the magnet 22 as shown in FIG. 2(A). The plate 23 is formed, for example round and in a plate shape.

The magnetic circuit 2 as structured above has a magnetic gap G formed annularly circumferentially between the yoke 21 and the plate 23.

The vibrating body 3 is bonded to the voice coil 33 directly or indirectly through a member such as that of a voice coil bobbin. The vibrating body 3 according to this embodiment has the diaphragm 31 and edge 32 as shown in FIGS. 1 and 2.

The diaphragm 31 is formed in a predetermined shape, for example in a flat plate shape, dome shape, and cone shape. The diaphragm 31 is fixed to the frame 5 vibratably through edge 32. Specifically, the outer periphery of the diaphragm 31 is bonded to the inner periphery of the edge 32 with adhesive. The diaphragm 31 of this embodiment is formed round and in a plate shape. The upper end portion of the voice coil 33 is bonded to the surface of the diaphragm 31 opposite to the acoustic wave emitting side, for example with adhesive. The diaphragm 31 is made of a known material, for example a metal material such as aluminum, titanium and beryllium, a resin material such as polyarylate, polyimide, and polyethylene naphthalate, a plastic, a paper, a reinforced plastic fiber or a ceramic material.

The outer periphery of the edge 32 is fixed to the upper end portion 5A of the frame 5 with adhesive while its inner periphery is bonded to the outer periphery of the diaphragm 31, supporting the diaphragm 31 vibratably. The cross-section shape of the edge 32 is formed in a predetermined shape such as convex, U-shape, V-shape, wavelike shape, corrugated shape, or plate shape in an acoustic wave emitting direction. The cross-section shape of the edge 32 is formed in a U-shape (concave) in an acoustic wave emitting direction.

The diaphragm 31 and the edge 32 can be integrally formed using a similar material such as resin.

The voice coil 33 is formed in a ring shape as shown in FIGS. 1 and 2. The voice coil 33 is formed by winding a conductive wire. The voice coil 33 is formed in a shape corresponding to that of the magnetic gap G of the magnetic circuit 2. The voice coil 33 according to this embodiment has a cylindrical shape.

The lead wire 4 pulled out of the voice coil 33 is connected through the passage 7 to the terminal part 6 provided in proximity of the frame 5 as shown in FIGS. 2(A) and 2(B). Further, the lead wire 4 has an extra length portion 41 in a bent shape between the passage 7 and the terminal part 6. The extra length portion 41 of the lead wire 4 is adapted to go around a part of the yoke 21 of the magnetic circuit 2.

The lead wire 4 is pulled out of the lower end portion of the voice coil 33, extends through the passage 7 to the inner periphery of the frame 5, bends near the inner periphery of the frame 5 toward the terminal part 6, and further extends in an arc from the bent portion 42 to the terminal part 6 along the inner periphery of the frame 5, thus being electrically connected and fixed to the terminal part 6.

More specifically, the lead wire 4 extends from the pull-out position of the voice coil 33 through the passage 7 in the radial and outside direction, bends approximately at 90 to 160 degrees with respect to the extending direction substantially in a direction toward the periphery of the voice coil, then further extends from the bent portion 42 to the terminal part 6 formed at a radially predetermined distance from the voice coil 33 such that an extra length portion 41 is formed in a predetermined length along the periphery of the voice coil 33.

A pair of the lead wires 4 is pulled out of the voice coil 33 as shown in FIG. 1. The pair of the lead wires 4 are configured substantially symmetrically with respect to the center of the voice coil 33. The configuration (pathway) of the lead wire 4 between the voice coil 33 and the terminal part 6 has a large affect on the weight balance of the voice coil 33. However, since the pair of the lead wires described above are configured substantially symmetrically with respect to the center of the voice coil 33, a bearing power of the pair of the lead wires are generated for the voice coil 33 to keep a balance, thus reducing unwanted vibration of the voice coil 33. In other words, the pair of the lead wires 4 are arranged substantially symmetrically to each other such that the weight balance of the voice coil or the vibrating body is maintained to a maximum extent.

Further, the lead wire 4 is also configured to maintain the balance of the voice coil 33 corresponding to the displacement of the gravity center of the voice coil 33 due to the winding of a conductive wire of the voice coil 33 from a winding start point through a winding end point.

Further, the lead wire 4 is configured such that the extra length portion 41 is located between the edge 32 and frame 5.

The lead wire 4 pulled out of the voice coil 33 has a plurality of bent portions. Having a plurality of bent portions, the lead wire 4 has the large bearing power and can support the voice coil 33 without generating abnormal vibration such as the rolling phenomenon. Also, the balance of the voice coil 33 is maintained. Further, the lead wire 4 having a predetermined rigidity or elasticity and the bent portions supports the voice coil 33 so as to prevent from the rolling vibration, for example.

The frame 5 supports the vibrating body 3 and houses the magnetic circuit 2. The frame 5 according to this embodiment has a section formed in a U-shape. The magnetic circuit 2 is arranged on a planar base portion 5B. Further, the frame 5 has a side portion 5C extending from the base portion 5B in an acoustic wave emitting direction. The upper end portion 5A of the side portion 5C is bonded to the outer periphery of the edge 32 thereto with adhesive or the like. The frame 5 is made of a predetermined material, such as resin.

The frame 5 has a support member 51 located between the passage 7 of the magnetic circuit 2 and the terminal part 6. The support member 51 is formed as a protrusion in a predetermined position of the frame 5 to contact and support the lead wire 4. The support member 51 can reduce the vibration or stress that is conducted from the voice coil 33 to the terminal part 6 through the lead wire 4. The support member 51 is formed on the outer periphery side of the extra length portion of the lead wire 4, contacting and supporting the lead wire 4 as shown in FIG. 1.

The terminal part 6 is formed in a predetermined position of the frame 5, having the end of the lead wire 4 pulled out of the voice coil 33 electrically connected thereto. A metal with a high electrical conductivity such as iron can be used for the terminal part 6. The terminal part 6 is formed in a position where the extra length portion 41 of the lead wire 4 is arranged between the passage 7 of the magnetic circuit 2 and the terminal part 6 as shown in FIGS. 1 and 2. Specifically, a pair of the terminal parts 6 is formed at a predetermined distance annularly from the two cutouts 71 formed at the yoke 21 through which the lead wire 4 passes as shown in FIG. 1. Further, the pair of the terminal parts 6 are formed substantially symmetrically with respect to the center axis of the voice coil 33.

More specifically, the terminal part 6 has an inner terminal part 61 and an outer terminal part 62 as shown in FIGS. 1 and 2. The inner terminal part 61 and the outer terminal part 62 are electrically connected to each other. The inner terminal part 61 is formed as a protrusion from the inner periphery of the frame 5, while the outer terminal part 62 is formed as a protrusion from the outer periphery of the frame 5. The outer terminal part 62 may be a protrusion from the base portion of the frame 5. The outer terminal part 62 can be electrically connected to the terminal part of an external circuit such as a sound signal processing circuit.

More specifically, the lead wire 4 extends from a lower end portion of the voice coil 33 near the cutout 71, or the passage 7, through the cutout 71 of the passage 7 toward substantially radially outside, and bends substantially in an annular direction (counterclockwise with reference to acoustic wave emitting direction), while the positions of the terminal part 6 and the support member 51 are configured such that the extra length portion 41 is formed in a predetermined length.

Hereinafter, the operation of the speaker device 1 as structured above is described with reference to the drawing. According to the speaker device 1, a sound signal is inputted from the terminal part 6 and inputted into the voice coil 33 through the lead wire 4 electrically connected to the inner terminal part 61 of the terminal part 6. An electromagnetic force is generated in the vertical direction (an acoustic wave emitting direction or its opposite direction) in accordance with a magnetic flux density (magnetic field intensity) formed in the magnetic gap G of the magnetic circuit 2 and a current level of the sound signal inputted into the voice coil 33. The voice coil 33 is driven by the electromagnetic force and vibrates in an acoustic wave emitting direction or its opposite direction.

When the driving force is transmitted to the diaphragm 31 through the voice coil 33, the vibrating body 3 vibrates in an acoustic wave emitting direction or its opposite direction in accordance with the driving force. The lead wire 4 of the voice coil 33 passes through the cutout 71 of the passage 7, formed in the yoke 21, goes around a part of the side portion 21C of the yoke 21, and connects to the terminal part 6 with the extra length portion as described above. Therefore, the lead wire 4 is displaced following the vibration of the voice coil 33.

According to the speaker device 1 having the thin and small magnetic circuit 2, the vibrating body 3 and the frame 5, etc., the lead wire 4 being connected to the terminal part 6 with the extra length portion after passing through the passage 7 can be prevented from contacting other member such as the yoke 21 and the edge 32 when the voice coil 33 is displaced in a vertical direction.

Specifically, if the lead wire 4 pulled out of the voice coil 33 passes through simply between the upper end portion of the yoke 21 and the edge 32 to connect to the terminal part 6 with reference to FIG. 2, there is a possibility that the lead wire 4 contacts the edge 32, because the interval between the upper end portion of the yoke 21 and the edge 32 is narrow. On the other hand, in the speaker device 1 according to the present invention, the passage 7 through which the lead wire 4 passes being provided in proximity of the magnetic circuit 2 as described above, the contact between the lead wire 4 and the edge 32 can be prevented even when the interval between the upper end portion of the yoke 21 and edge 32 is narrow.

In addition, the speaker device 1 can reduce a generation of abnormal noise caused by such the contact. In other words, a thin and/or small speaker device with high acoustic quality can be produced.

Furthermore, the speaker device 1 can prevent from the breakage of the lead wire 4 caused by the contact between the lead wire 4 and other member as described above.

Furthermore, the cutout 71 of the passage 7, being configured substantially symmetrically with respect to the center axis of the voice coil 33 at a predetermined distance as shown in FIG. 1. A pair of the lead wires 4 being configured substantially symmetrically with respect to the center point of the voice coil 33, the balance of the voice coil 33 can be maintained to reduce unwanted vibration of the voice coil 33. Therefore, the speaker device 1 can be produced with high quality.

[Second Embodiment]

Figure 3:
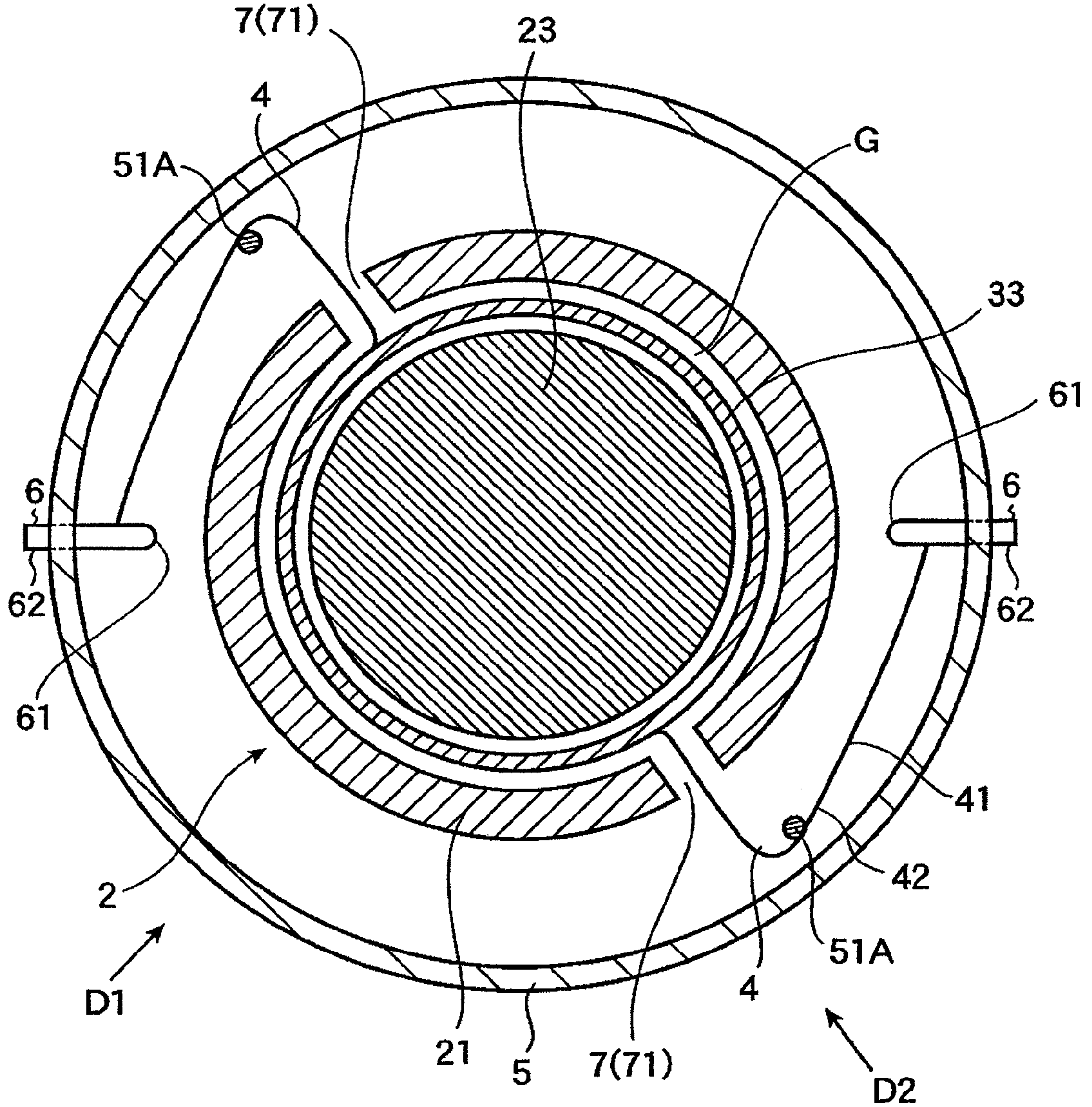
FIG. 3 is a plan view of the speaker device 1A according to a second embodiment of the present invention.

FIG. 3 is a plane view of the speaker device 1A according to a second embodiment of the present invention. The same configurations as the first embodiment are not repeatedly described. In a speaker device 1A according to the present embodiment, the support member 51A disposed between the voice coil 33 and the terminal part 6 is formed near the cutout 71, or the passage 7, compared to the first embodiment. Further the support member 51A is located in the inner periphery side of the bent portion 42 of the lead wire 4.

The bent portion 42 of the lead wire 4 can be easily formed, as the support member 51A is formed near the cutout 71, or the passage 7, and located in the inner periphery side of the bent portion 42 of the lead wire 4, according to the above speaker device 1A. Specifically, the lead wire 4 is originally pulled out of the voice coil 33 in a straight line. When freely fitting the voice coil 33 in the magnetic gap G of the magnetic circuit 2, the lead wire 4 in the above described form can be easily obtained by bending the lead wire 4 pulled out of the voice coil 33 around the support member 51A to form the bent portion 42, then connecting the end of the lead wire 4 to the terminal part 6.

[Third Embodiment]

Figure 4:
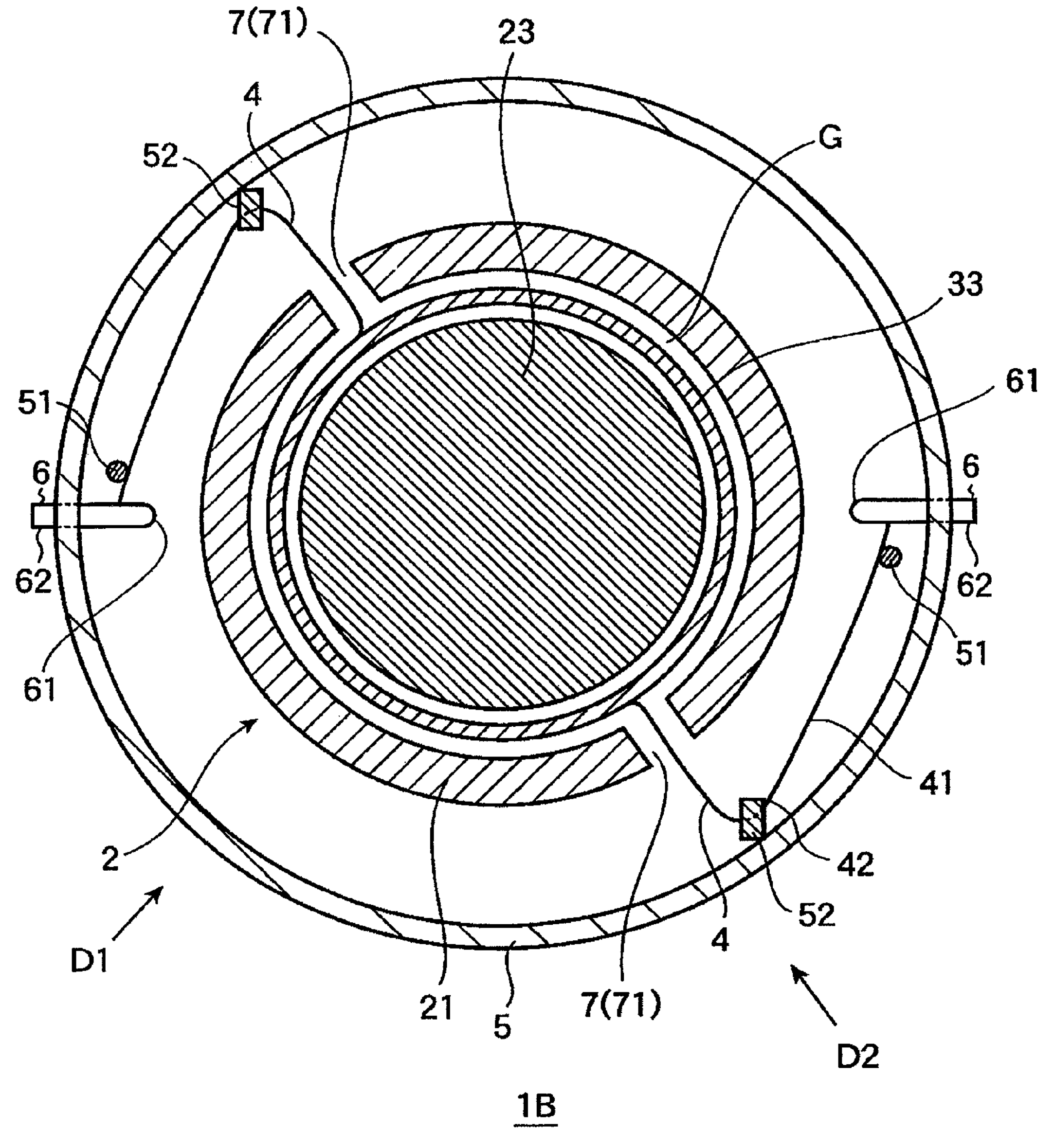
FIG. 4 is a plan view of the speaker device 1B according to a third embodiment of the present invention.
Figure 5:
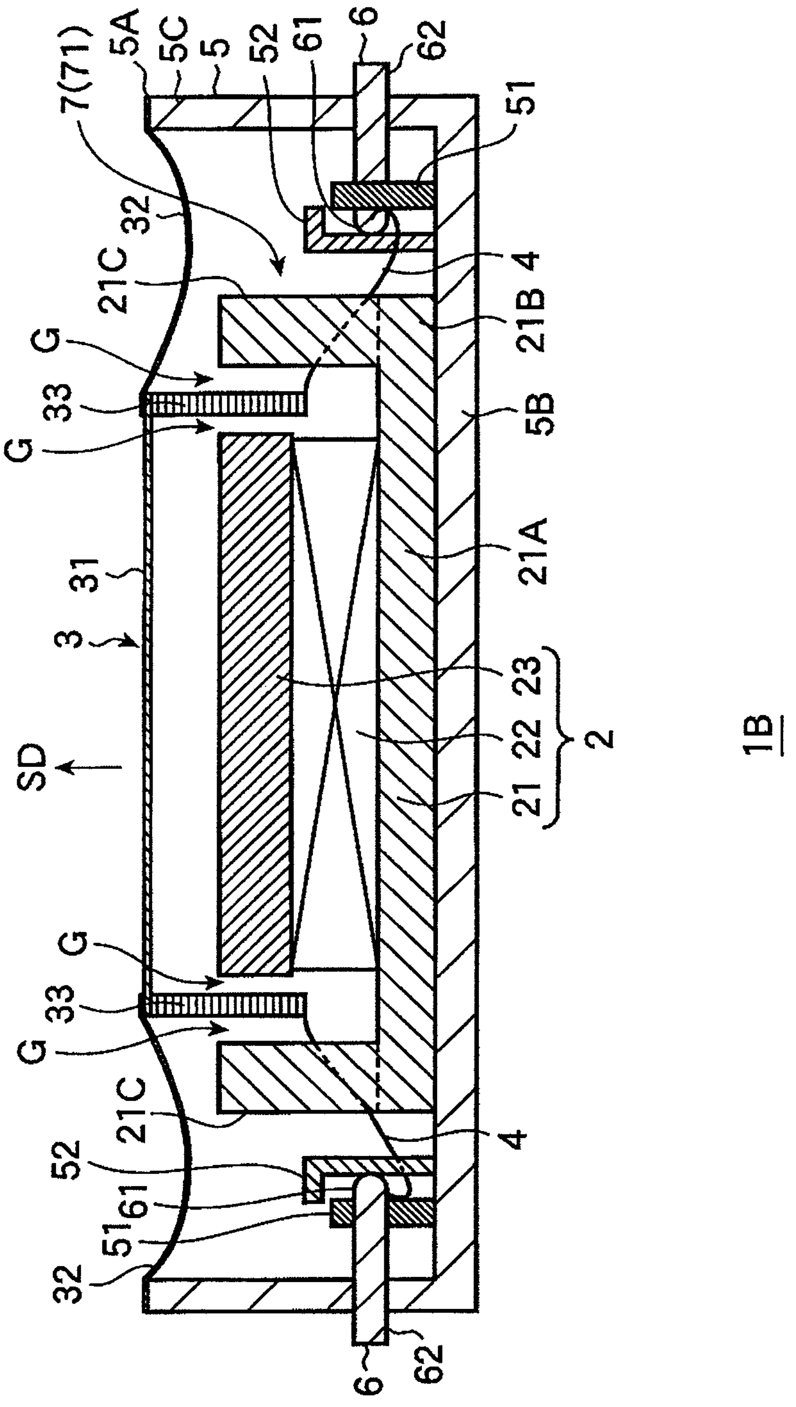
FIG. 5 is a sectional view of the speaker device 1B viewed from a viewing direction D1 shown in FIG. 4.

FIG. 4 is a plane view of the speaker device 1B according to a third embodiment of the present invention, where any diaphragm or the edge is not shown. FIG. 5 is a cross-sectional view of the speaker device 1B viewed from a viewing direction D1 shown in FIG. 4. The same configurations as the first and second embodiments are not repeatedly described.

The speaker device 1B according to the present embodiment has a first support member 51 and a second support member 52, as shown in FIGS. 4 and 5. The first support member 51 is the similar constituent element as the support member 51 of the first embodiment.

The second support member 52 is formed in substantially the same position as the support member 51A according to the second embodiment, having substantially the similar function as the support member 51 A. The second support member 52 according to the present embodiment is formed in a reverse L-shape as shown in FIG. 5.

In the speaker device 1B as structured above including support member 52 in the reverse L-shape and support member 51, a stress is prevented from being applied to a connecting portion to the terminal part 6 while the lead wire 4 is prevented from being disconnected with the terminal part even when the lead wire 4 vibrates during a speaker is driven.

[Fourth Embodiment]

Figure 6:
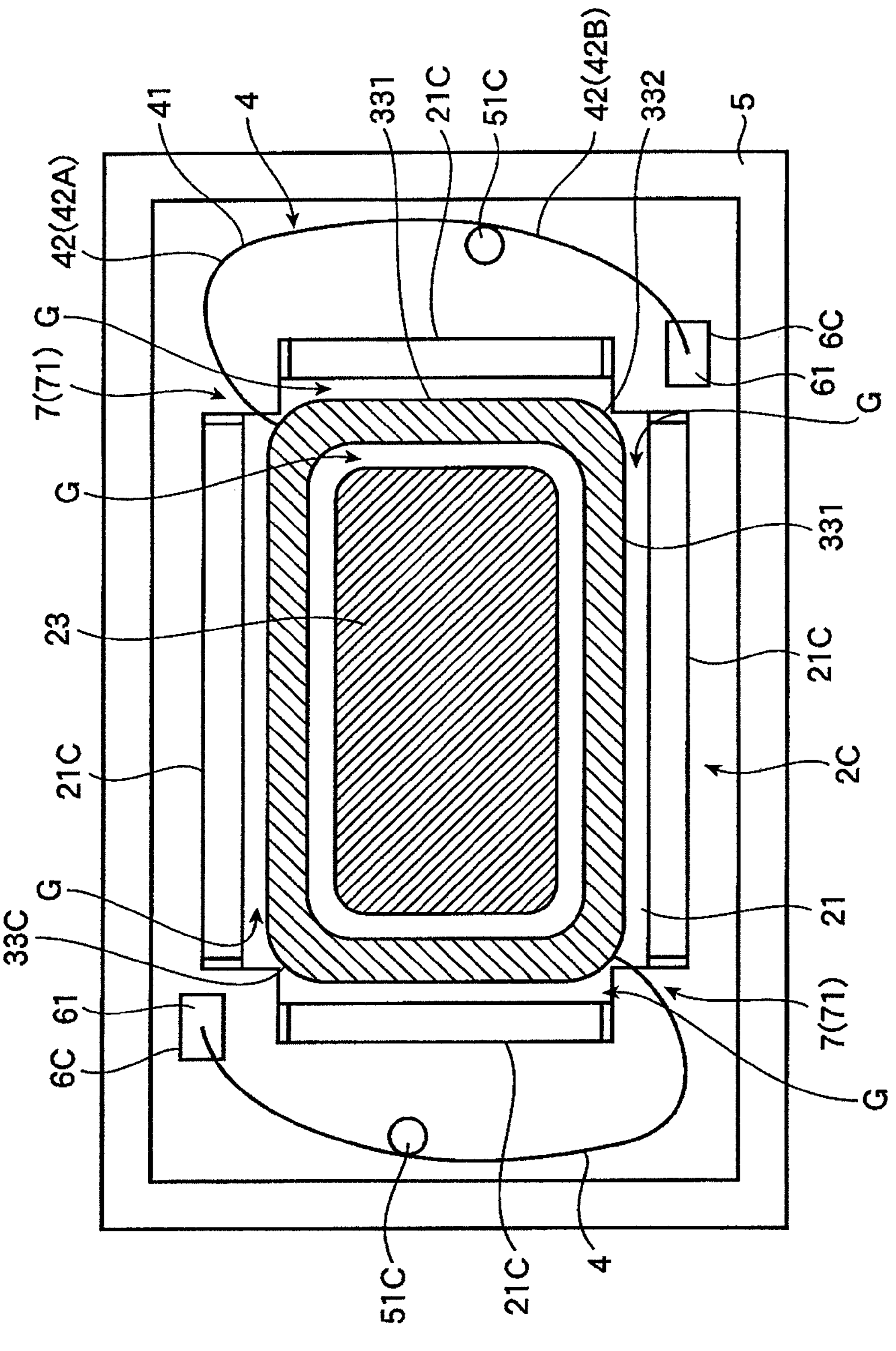
FIG. 6 is a plan view of the speaker device 1C according to a fourth embodiment of the present invention.
Figure 7:
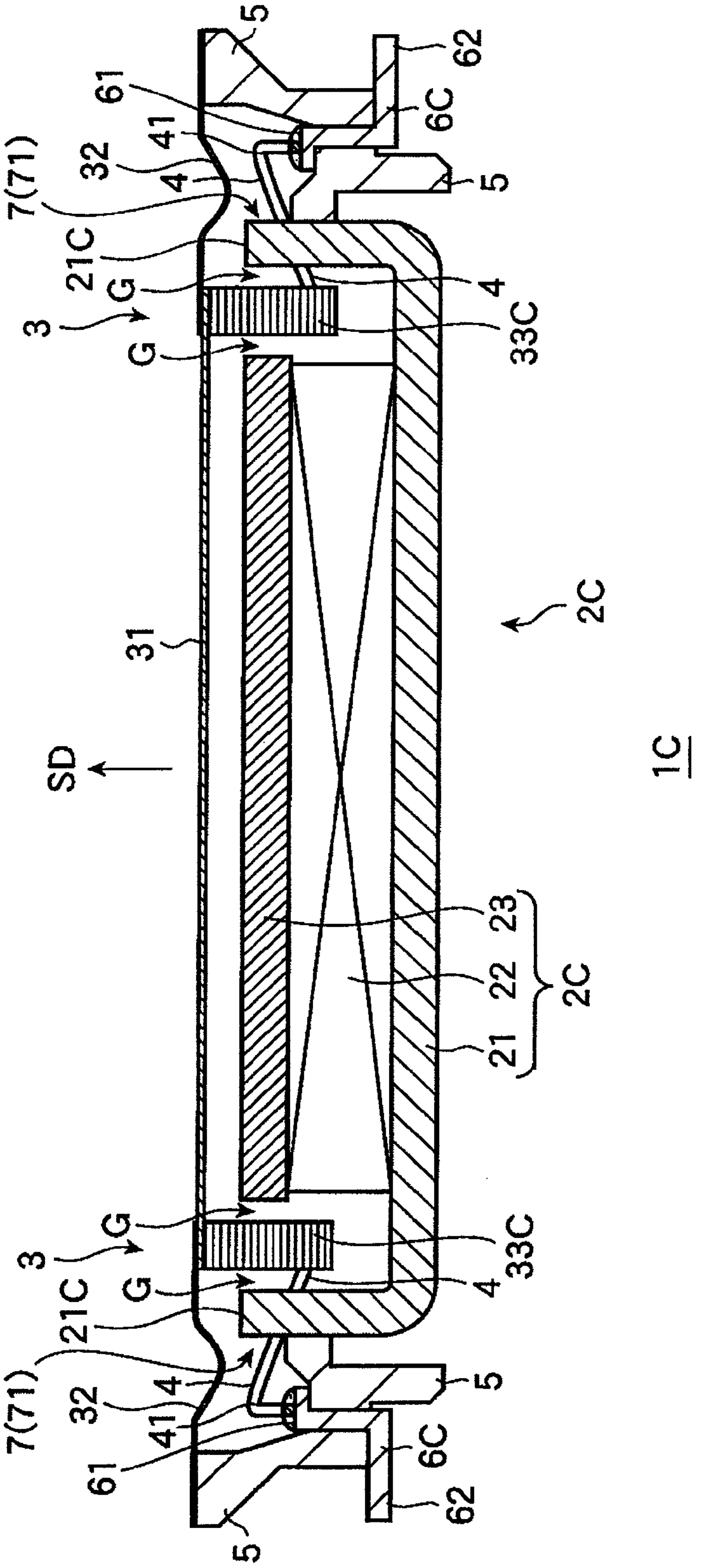
FIG. 7 is a sectional view of the speaker device 1C shown in FIG. 6.
Figure 8:
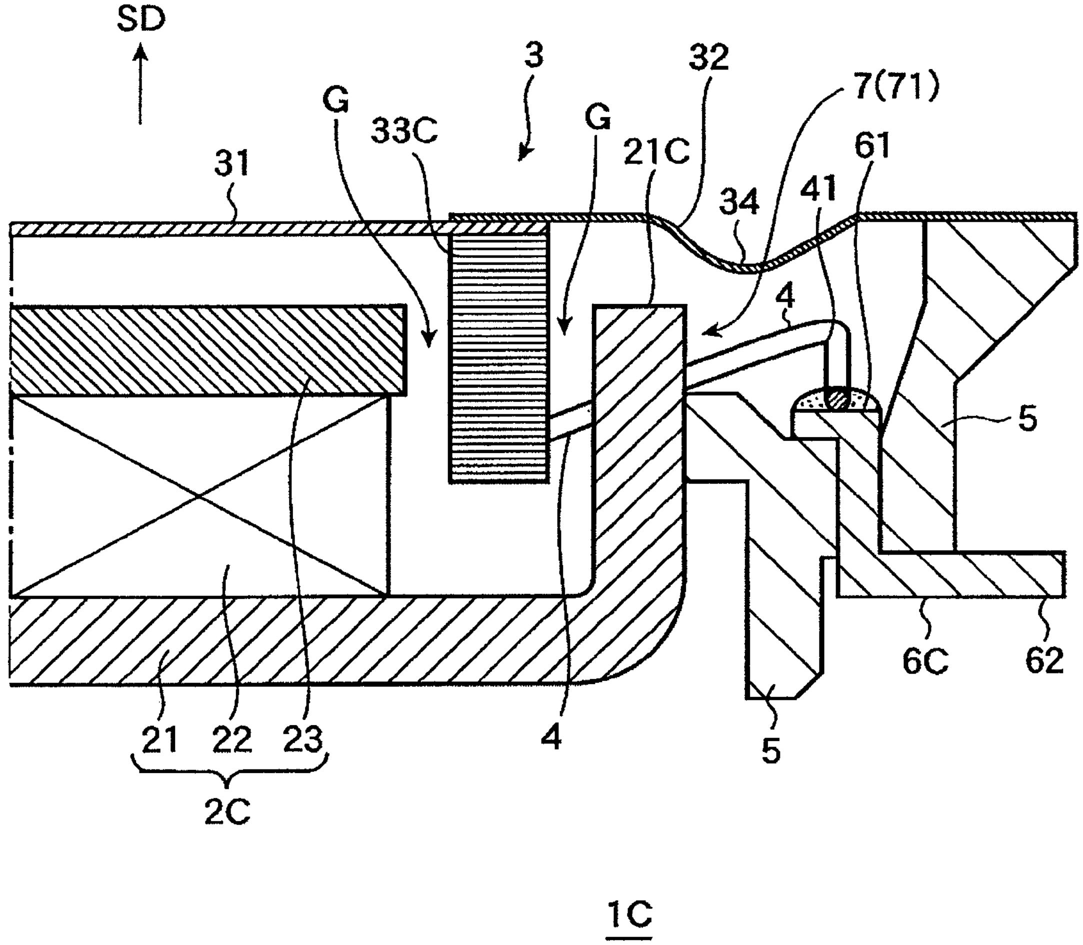
FIG. 8 is an enlarged sectional view around a lead wire 4 of the speaker device 1C shown in FIG. 7.
Figure 9:
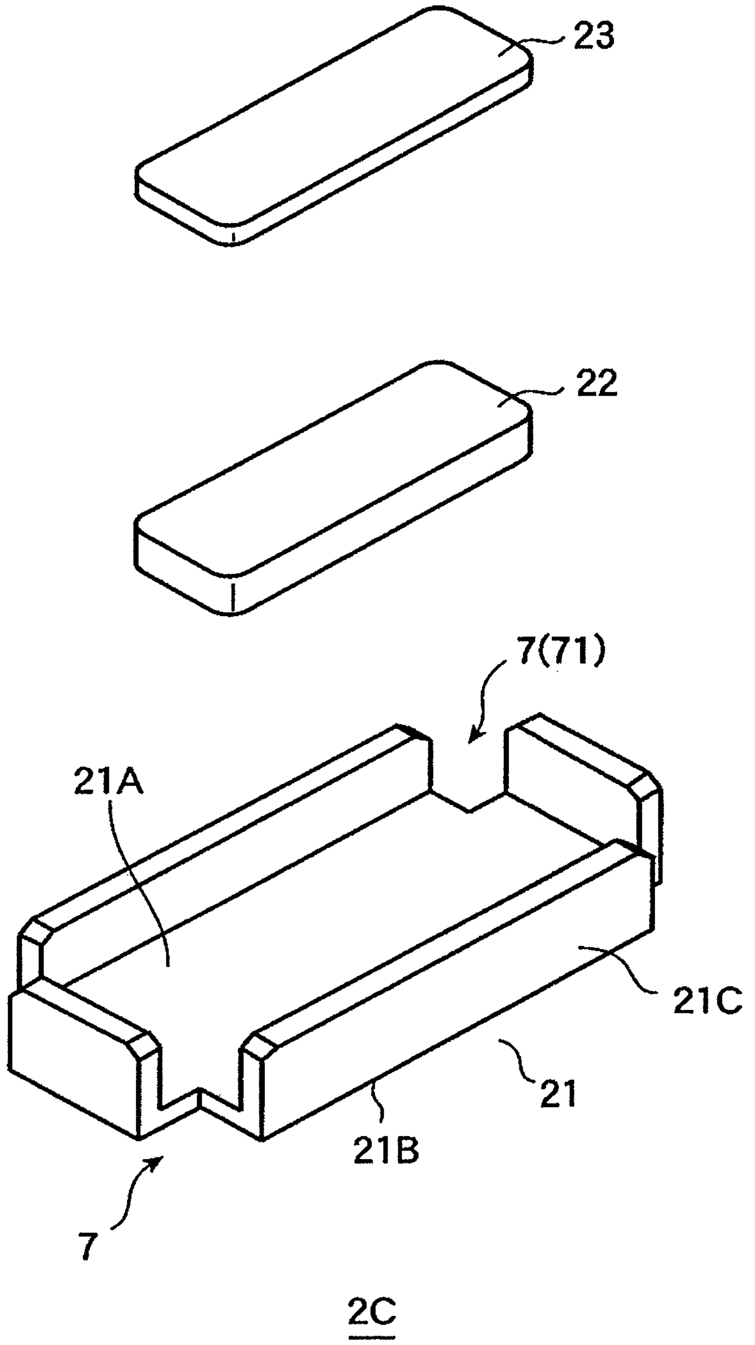
FIG. 9 is an exploded perspective view of the magnetic circuit 2C of the speaker device 1C shown in FIG. 6.

FIG. 6 is a plane view of the speaker device 1C according to a fourth embodiment of the present invention. FIG. 7 is a cross-sectional view of the speaker device 1C shown in FIG. 6. FIG. 8 is an enlarged cross-sectional view around a lead wire 4 of the speaker device 1C shown in FIG. 7. FIG. 9 is an exploded perspective view of the magnetic circuit 2C of the speaker device 1C shown in FIG. 6. The diaphragm and the edge of the speaker device 1C are not shown in FIG. 6. The same configurations as those in the first to third embodiments are not repeatedly described.

The speaker device 1C according to the present embodiment has a magnetic circuit 2C, a voice coil 33C and a frame 5 as shown in FIG. 6.

The magnetic circuit 2C according to the present embodiment is formed substantially in a rectangular shape when viewed in the acoustic wave emitting direction as shown in FIGS. 6 and 9. The magnetic circuit 2C has a substantially rectangular bottom portion 21A, a bent portion 21B bent toward the acoustic wave emitting direction from the bottom portion 21A, and a side portion 21C extending toward the acoustic wave emitting direction from the bent portion 21B. The magnetic circuit 2C according to the present embodiment has the passage 7 formed in a corner of the substantially rectangular shape. Specifically, the yoke 21 has four corners and the cutout 71 is formed in the each corner of the four corners. The passage 7 through which the lead wire 4 passes is formed in at least two opposing corners of the four corners of the yoke 21 as shown in FIG. 6.

The voice coil 33C is formed substantially in a rectangular shape when viewed in the acoustic wave emitting direction, having a straight portion 331 and a curved portion 332 as shown in FIG. 6. The voice coil 33C is freely fitted in the magnetic gap G of the magnetic circuit 2. The lead wire 4 pulled out of the voice coil 33C is pulled out of the straight portion 331 to reduce a stress applied to the pull-out portion.

The frame 5 has a terminal part 6C formed near the corner where the passages 7 of the magnetic circuit 2 are not configured as shown in FIG. 6. Specifically, the terminal part 6C has an inner terminal part 61 formed inside of the frame and an outer terminal part 62 formed outside of the frame, the inner terminal part 61 and the outer terminal part 62 being electrically connected.

Further, the frame 5 has a support member 51 C for supporting the lead wire 4 formed between the passage 7 of the magnetic circuit 2C and the terminal parts 6C as shown in FIG. 6. The support member 5C is formed as a protrusion at a predetermined position of the frame 5 to contact and support the lead wire 4. The support member 51C according to the present embodiment is positioned inside of the extra length portion 41 of the lead wire 4.

The lead wire 4 is pulled out from near the corner of the voice coil 33C, passes through the cutout 71 of the passage 7, and bent substantially along a short axis to be fixed to the terminal part 6. The bent portions 42 according to this embodiment have a plurality of bent portions 42A and 42B in FIG. 6. The lead wires 4 having a plurality of bent portions 42A and 42B can has the large bearing power and support the voice coil 33C so as to suppress the generation of abnormal vibration such as the rolling phenomena. Further the balance of the voice coil 33C can be maintained.

In an initial state where the level of the sound signal is zero, the lead wire 4 of the voice coil 33C is pulled out of near the lower end of the voice coil 33C, passes through the passage 7, extends obliquely upward from the pull-out position, then bends to be fixed and electrically connected to the inner terminal part 61 configured substantially in the same horizontal level as the pull-out position, as shown in FIG. 8 for example. In other words, the lead wire 4 passes through the cutout 71 of the passage 7, and go around a part of the yoke 21 to be connected to the terminal part 6.

The speaker device 1C as configured above, having the lead wire 4 formed as described above, the lead wire 4 is prevented from contacting other member such as the edge 32 and the yoke 21 even when the voice coil 33C vibrates.

Although the speaker device 1C is a thin device having the narrow space between the edge 32 and the yoke 21, as shown in FIG. 8, the deterioration of the acoustic quality due to the contact of the lead wire 4 with other member such as the edge or the yoke can be decreased, because the lead wire 4 of the voice coil 33C passes through the passage 7 of the magnetic circuit 2 and connects to the inner terminal part 61. Further, in this embodiment the extra length portion 41 being arranged closer to the frame 5 than to the top portion 34 of the edge 32, the contact between the extra length portion 41 and the edge 32 can be prevented. The extra length portion can be arranged closer to yoke 21.

[Examples of Passages]

Figure 10:
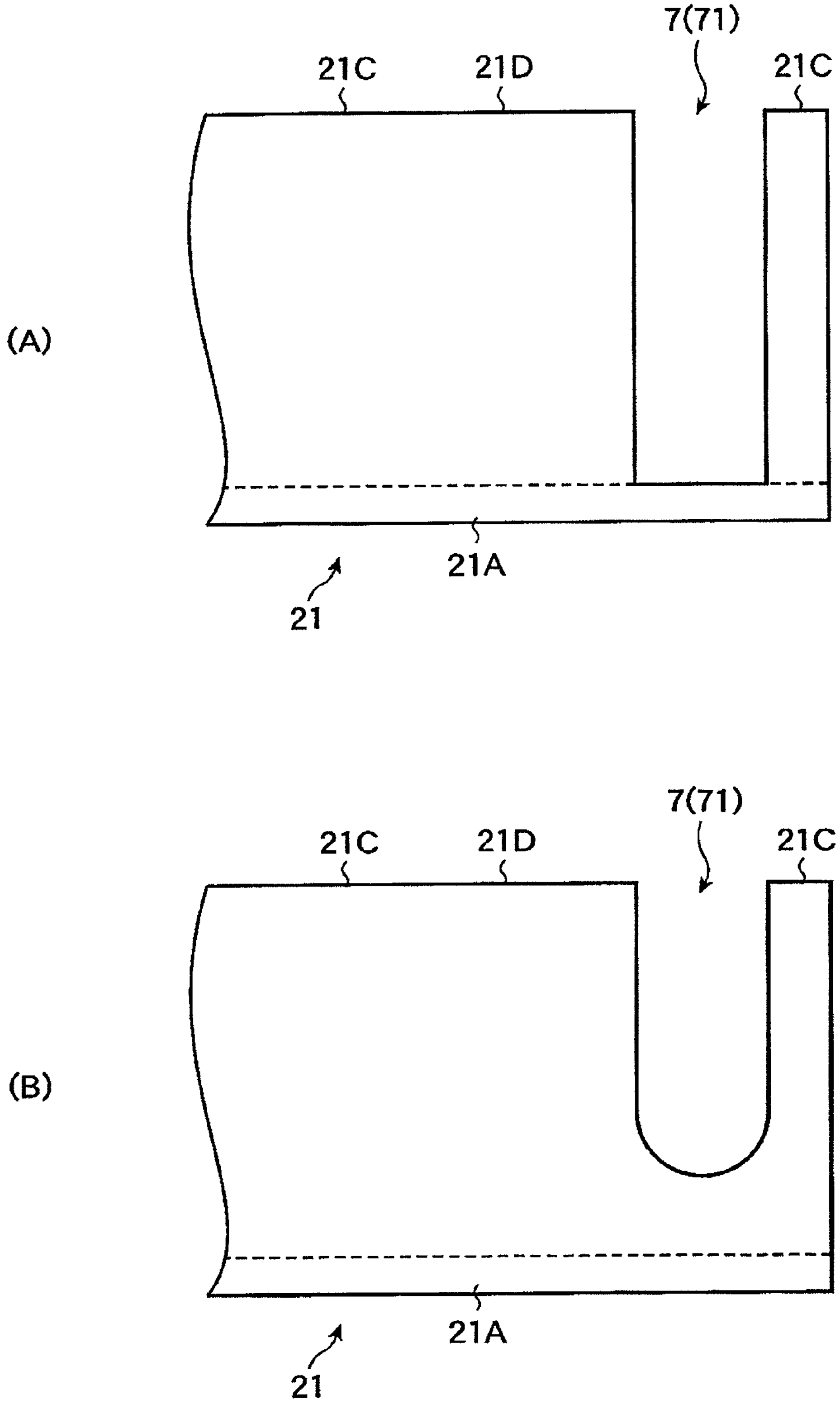
FIG. 10(A) is a side view of a passage through which the lead wire of the speaker device may be pulled according to the first embodiment of the present invention.
FIG. 10(B) is a side view of a passage through which the lead wire of the speaker device may be pulled according to the second embodiment of the present invention.

FIG. 10(A) is a side view of a passage of the speaker device according to the first embodiment of the present invention. FIG. 10(B) is a side view of a passage of the speaker device according to the second embodiment of the present invention. The passage 7 formed in the magnetic circuit 2C can have a cutout 71 from the upper end portion 21D to the bottom portion 21A of the yoke 21 as shown in FIG. 10A. The passage 7 of the magnetic circuit 2C can have a cutout 71 in a predetermined distance from the upper end portion 21D toward the bottom portion 21A of the yoke 21, as shown in FIG. 10B. The magnetic circuit 2C is configured such that the lead wire 4 does not contact the cutout 71 of the passage 7 even when the voice coil 33 vibrates.

[Balance of Voice Coil]

Figure 11:
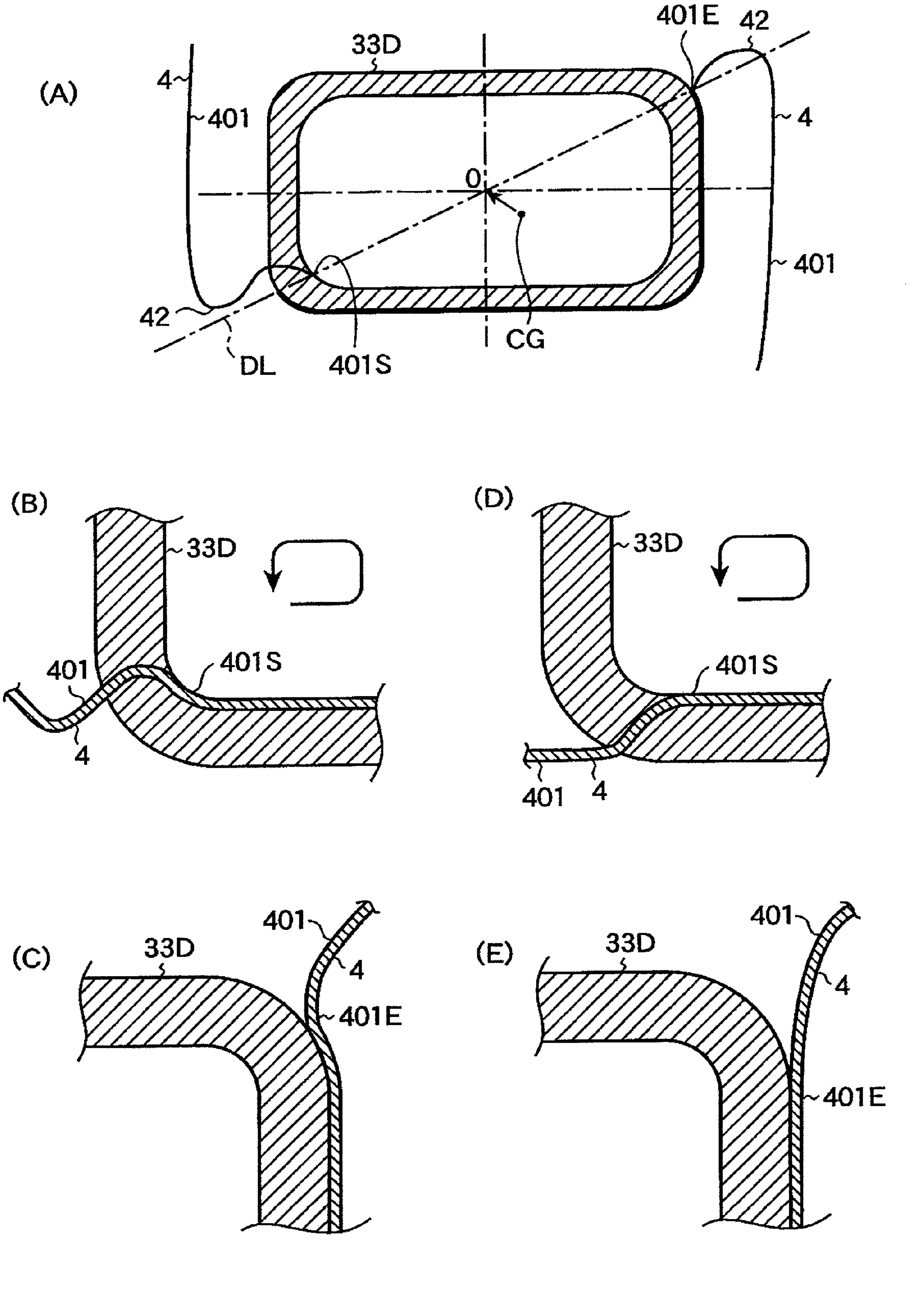
FIG. 11(A) is a front view of the speaker device according to one embodiment of the present invention, illustrating a voice coil 33D.
FIG. 11(B) is an enlarged view around a winding start point of the conductive wire 401 of the voice coil shown in FIG. 11(A)
FIG. 11(C) is an enlarged view around a winding end point of the conductive wire 401 of the voice coil shown in FIG. 11(A)
FIG. 11(D) is a view of a voice coil modified from the voice coil shown in (B)
FIG. 11(E) is a view of a voice coil modified from the voice coil shown in FIG. 11(C)

FIG. 11(A) is a front view of the speaker device according to another embodiment of the present invention, illustrating a voice coil 33D, FIG. 11(B) is an enlarged view around a winding start position of the conductive wire 401 of the voice coil shown in FIG. 11(A), FIG. 11(C) is an enlarged view around an winding end position of the conductive wire 401 of the voice coil shown in FIG. 11(A), FIG. 11(D) is a view of a voice coil modified from the voice coil shown in FIG. 11(B), and FIG. 11(E) is a view of a voice coil modified from the voice coil shown in FIG. 11(C).

In the voice coil 33D according to the present embodiment, a shape of a pair of the lead wires 4 has a shape to be substantially symmetrical with respect to the center O of the voice coil 33D, as shown in FIGS. 11(A) to 11(C). As the position of a gravity center CG of the voice coil 33D is different from the center O, the shape of the lead wire 4 is configured to maintain the balance of the voice coil 33D. A pair of the lead wires 4 is arranged in the substantially symmetrical position with respect to each other so as to maintain the weight balance of the voice coil or the vibrating body to a maximum extent.

Specifically, as shown in FIG. 11(A) to (E) the conductive wire 401 of the voice coil 33D starts to wind at winding start position 401S near the corner of the rectangular shape and ends to wind at winding end position 401E near the opposite corner after a predetermined number of turns (N turns). In this situation, the gravity center CG is weighted from the center O of the voice coil 33D due to the weight of half a round of the conductive wire 401 from the winding start position 401S to the winding end position 401E.

Therefore, the shape of the leading wire 4 is configured to maintain the balance of the voice coil 33D as the gravity center CG is weighted from the center O of the voice coil 33D. Specifically, the gravity center CG of the voice coil 33D and the position of the bent portion 42 of the lead wire 4 are configured to be on opposite sides to each other with respect to a diagonal line DL passing through the center O of the voice coil 33D as shown in FIGS. 11(A) to 11(E). In the voice coil 33D as described above, the shape of the bent portion 42 of the pair of the lead wires 4 is configured to maintain the balance of the voice coil 33D considering a line density of the lead wire 4.

The speaker device according to the embodiment of the present invention can maintain the balance of the voice coil 33D and be prevented from being deterioration of the acoustic quality by applying the above constitution.

[Fifth Embodiment]

Figure 12:
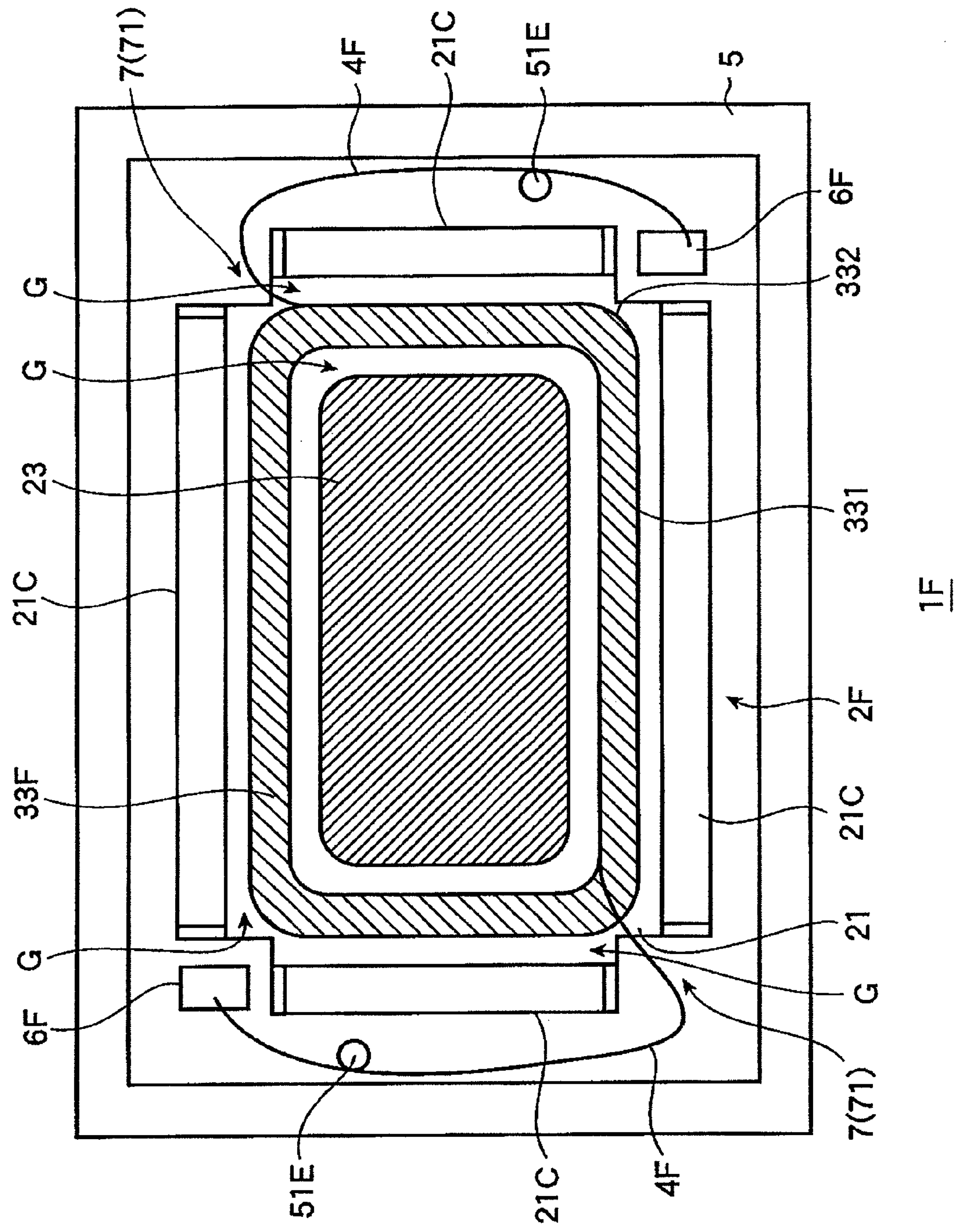
FIG. 12 is a plan view of the speaker device 1F according to a fifth embodiment of the present invention.

FIG. 12 is a plane view of the speaker device 1F according to a fifth embodiment of the present invention. The same configurations as the fourth and fifth embodiments are not repeatedly described. The speaker device 1F according to the present embodiment has a support member 51E according to fourth embodiment applied closer to the terminal part 6F than that applied near the center of the short axis of the yoke, as shown in FIG. 12. Further the lead wire 4F according to the present embodiment is formed in a bending shape according to the position of the support member 51E.

The speaker device 1F as structured above, as configured above, has high damping performance since a leading wire 4F between the passage 7 and the support member 51E is longer than that according to the fourth embodiment. Further, the support member 51E being arranged near the terminal part 6F, the generation of vibration of the lead wire 4, the stress applied to the connecting portion between the lead wire 4 and the terminal part 6F, and disconnection of the lead wire 4 from the terminal part 6F can be prevented.

[Sixth Embodiment]

Figure 13:
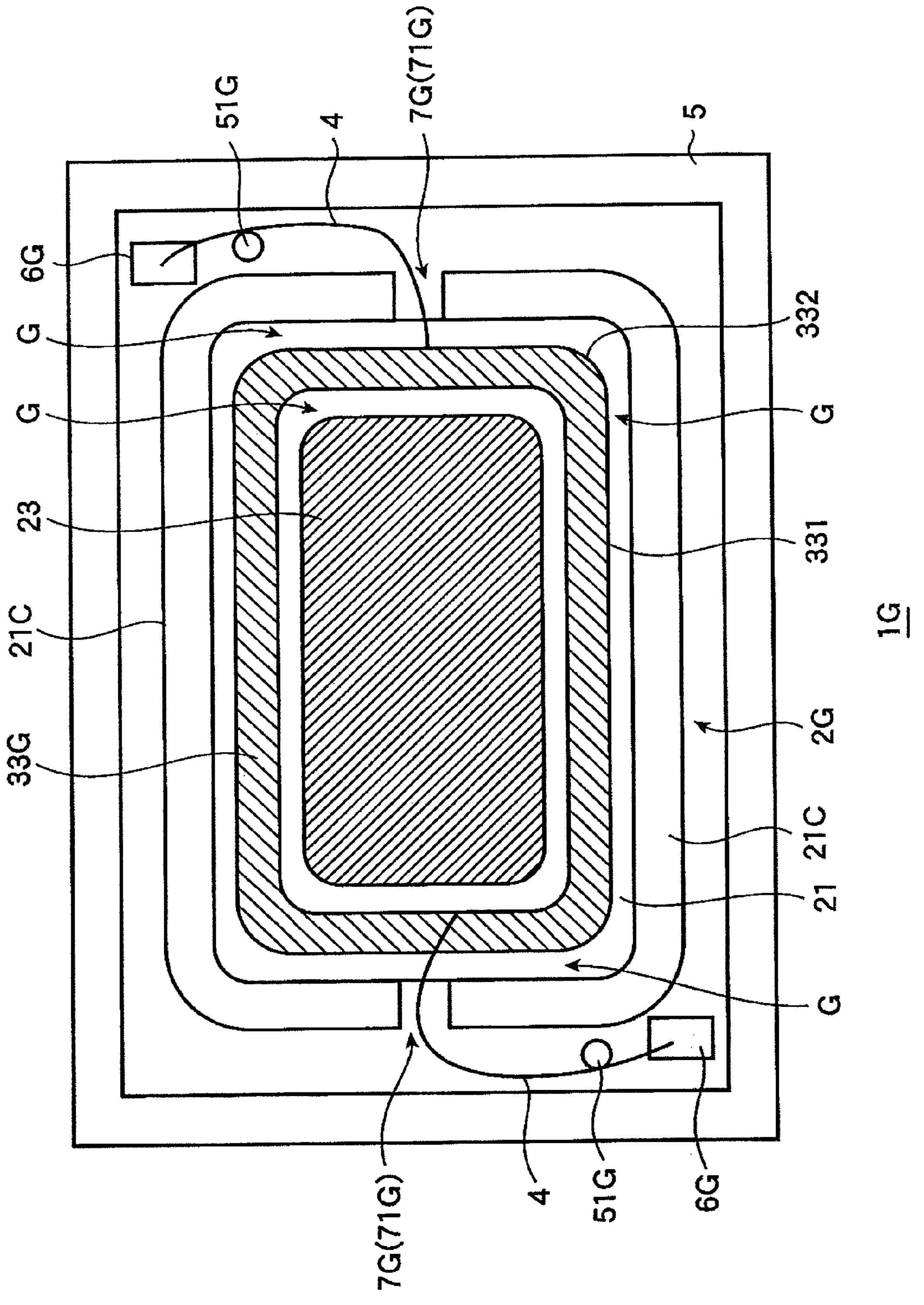
FIG. 13 is a plan view of the speaker device 1G according to a sixth embodiment of the present invention.

FIG. 13 is a plane view of the speaker device 1G according to a sixth embodiment of the present invention. The same configurations as those of the fourth and fifth embodiments are not repeatedly described. The speaker device 1G has the passage 7 of a magnetic circuit 2G formed near the center of the short axis of a yoke 21G as shown in FIG. 13. Further, a terminal part 6G is configured near the corner of the rectangular magnetic circuit 2G. A support member 51G is configured near the terminal part 6G. The lead wire 4 pulled out of the voice coil 33G passes through the cutout 71G of the passage 7G, bends toward the terminal part 6G, contacts the support member 51G, and gets fixed and electrically connected to the terminal part 6G The speaker device 1G as structured above can reduce the space for the extra length portion of the lead wire comparing with the fourth and fifth embodiments. Further, the lead wire 4 supporting the voice coil 33G along its longitudinal axis, it has a high damping performance comparing with the fourth and fifth embodiments.

The present invention is not limited to the above-mentioned embodiments. The present invention can be performed not only by each embodiment but by a combination of these embodiments. An outer-magnet-type magnetic circuit, for example can be used as the magnetic circuit of the speaker device according to the present invention. The outer-magnet-type magnetic circuit has a yoke with a center pole in the central portion, a ring-shaped magnet engaged with the center pole and a ring-shaped plate disposed on the ring-shaped magnet. And, a cutout of a passage is provided at either the magnet or the plate. The speaker device applying the outer-magnet-type magnetic circuit as structured above has the lead wire pulled out of the voice coil freely fitted in the magnetic circuit and connected to the terminal part formed at the frame through the cutout, or the passage, thus the contact of the lead wire with other member can be prevented.

Also, in the above embodiment, the cutout (opening) is applied to the passage 7 of the magnetic circuit 2, but the passage is not limited to the embodiment described above. For example, the passage of the magnetic circuit can be formed, as a through-hole provided on the side of the yoke of an inner-magnet-type magnetic circuit. The lead wire pulled out of the voice coil freely fitted in a magnetic gap G formed in inner-magnet-type magnetic circuit is connected to a terminal part provided in proximity of a frame through the through-hole provided at the yoke. The speaker device as described above can apply substantially uniform magnetic field intensity to the magnetic gap.

The voice coil according to the fourth embodiment is formed substantially in a rectangular shape. However the invention is not limited to the configuration. The voice coil can be configured to have a track shape including at least a straight portion, a substantially rectangular shape, an elliptical shape or a round shape, etc corresponding to the configuration of a speaker. The lead wire contacts the support member 51 according to the embodiments described above. However the invention is not limited to this configuration. The lead wire can be configured not to contact the support member 51. Further, the support member 51 is provided in proximity of the frame 5. However the support member 5 can be eliminated as necessary.

The speaker device 1 according to the present invention, includes a magnetic circuit 2 having a magnetic gap where a voice coil 33 freely fits, a vibrating body 3 bonded directly or indirectly to the voice coil 33, a frame 5 for supporting the vibrating body 3 and housing the magnetic circuit 2, and a terminal part 6 to which the lead wire 4 of the voice coil 33 is connected. A passage 7 is arranged between the voice coil 33 which is freely fitted in the magnetic gap G and the terminal part 6 provided in proximity of the frame 5. The lead wire 4 is pulled out of the voice coil 33. Thus, even when the speaker device 1 is thin and small, the generation of abnormal noise due to contact of the lead wire 4 with other member can be prevented. In addition, breakage of the lead wire of the voice coil can be prevented.

The invention claimed is:

1. A speaker device, comprising:
a magnetic circuit comprising:
a magnetic gap where a voice coil freely fits;
a magnet; and
a yoke comprising:
a substantially rectangular bottom portion contacting one pole of the magnet; and
a side portion extending toward an acoustic wave emitting direction from a short side of the substantially rectangular bottom portion contacting the one pole of the magnet;
a vibrating body bonded directly or indirectly to the voice coil;
a frame that supports the vibrating body;
a terminal part that inputs an electrical signal into the speaker device; and
a lead wire placement portion outside of the yoke and substantially parallel to the side portion of the yoke and between the frame and the vibrating body, wherein a lead wire pulled out of the voice coil is at least partially disposed in a space of the lead wire placement portion and connects to the terminal part, wherein an end portion of the side portion toward the acoustic wave emitting direction is provided farther toward the acoustic wave emitting direction than the area of the lead wire placement portion.

2. The speaker device according to claim 1, wherein the lead wire pulled out of the voice coil passes through a space between the vibrating body and near a corner of the bottom portion.

3. The speaker device according to claim 2, wherein the lead wire comprises a bent portion disposed between a portion of the lead wire passing through the space and a portion of the lead wire disposed at the lead wire placement portion.

4. The speaker device according to claim 1, wherein the lead wire is disposed in an area of the lead wire placement portion below an end portion of the side portion along the acoustic wave emitting direction.

5. The speaker device according to claim 2, wherein the terminal part is disposed near another corner of the bottom portion.

6. The speaker device according to claim 1, wherein the vibrating body includes a diaphragm and an edge, and the edge is disposed at an outer periphery side of the voice coil.

7. The speaker device according to claim 1, wherein the side portion is substantially rectangular with a long side thereof shorter than a short side of the bottom portion.

8. The speaker device according to claim 7, wherein the yoke further comprises a side portion extending toward the acoustic wave emitting direction from a long side of the bottom portion, and a passage is disposed through which the lead wire passes between the side portion extending from the long side and the side portion extending from the short side of the bottom portion.

9. The speaker device according to claim 1, wherein a side portion extends toward the acoustic wave emitting direction from the other short side of the bottom portion.

* * * * *

UNITED STATES PATENT AND TRADEMARK OFFICE

CERTIFICATE OF CORRECTION

PATENT NO. : 8,638,976 B2
APPLICATION NO. : 12/670819
DATED : January 28, 2014
INVENTOR(S) : Kazuaki Watanabe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this
Second Day of June, 2015

Michelle K. Lee

Michelle K. Lee
*Director of the United States Patent and Trademark Office*